July 15, 1952  A. G. BUTLER  2,603,735
WELDING PROCESS AND JOINT
Filed Sept. 12, 1949

INVENTOR
ADOLF G. BUTLER
BY
Mason & Graham
ATTORNEYS

Patented July 15, 1952

2,603,735

UNITED STATES PATENT OFFICE 2,603,735

WELDING PROCESS AND JOINT

Adolf G. Butler, Hawthorne, Calif., assignor to American Pipe and Construction Co., a corporation of Delaware Application September 12, 1949, Serial No. 115,291

4 Claims. (Cl. 219—4)

This invention has to do with splicing or joining wire, particularly hard-drawn high carbon steel wire of high tensile strength. By high tensile strength I mean wire having a rated tensile strength of the order of 180,000 pounds per square inch and up.

One common method of joining high tensile steel wire is to crush a collar over the abutting ends to be joined thereby deforming the wires and collar into holding engagement with each other. Another and more recent method is to join the ends of the wires by welding. Both these methods, and various other methods so far as I am aware, have the objection that the joint produced is weaker than the wire itself.

An object of this invention is to provide a novel and improved method of joining wire, particularly high tensile steel wire, which produces a joint which is stronger than the wire itself.

Another object is to provide a novel and improved type of joint for wire. More particularly, it is an object to provide a joint in which a sleeve made up of two sections welded together overlies and is welded to the wire.

A further object of the invention is to provide a method of joining wire which is simple to perform and can be economically carried out.

Another object is to provide a method of joining wire by welding which permits of and facilitates austempering of the joint.

These and other objects will be apparent from the drawing and the following description.

Referring to the drawing, which is for illustrative purposes only:

The method of the invention may be generally described as comprising the steps of applying sleeve sections to the wire ends to be joined and joining the wire ends and the sleeve sections into an integral unit, preferably by resistance welding and accompanied by austempering of the weld. By resistance welding I refer to the type of welding wherein the parts to be joined are raised to the temperature of fusion by the passage of a heavy electrical current therethrough and pressure is then applied to bring about the union.

More particularly describing the invention, numeral 11 designates the wires to be joined. While the method of this invention was primarily designed for joining high tensile steel wire of the type previously described and the wires 11 may be considered to be of this character, it is contemplated that the method may also be useful in joining other types of wires and rods.

Figure 4:
Fig. 4 is a view showing the parts assembled prior to welding.

The wires 11 are preferably provided with flat end faces 12. Each wire is fitted with a steel sleeve 14 as shown in Fig. 4. The sleeves may be formed of a mild steel or an alloy steel. The internal diameter of the sleeves is preferably such that the sleeves fit relatively tightly on the wires and the fit may be described as a light drive fit.

To facilitate welding, the ends of the sleeves to be joined are beveled to produce the frustoconical end faces 15 thereon. I prefer to bevel the sleeves before assembling them on the wires, however this is a matter of convenience.

After the sleeves and wires are assembled as shown in Fig. 4, the two sets of assembled parts are clamped in jaws 16 of a resistance welding machine. Since such machines are well known in the welding art, only the jaw portions thereof have been shown in the drawing and these are schematically shown. Each jaw is provided with a pair of clamp plates 17 which are connected in the electrical welding circuit of the machine.

Figure 5:
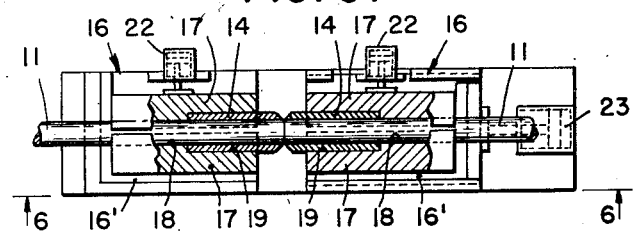
Fig. 5 is a plan view showing the wires to be joined with the sleeve sections thereon with the parts held clamped in the jaws of a welding machine in position to be welded.

I prefer to provide each section 17 of the plates with an elongated recess 18 for receiving the wire and a counter recess 19 for receiving the sleeve. The two elements of the jaw are secured together tightly in clamping relation to the wire and sleeve by any suitable means. By way of illustration I show one clamp plate abutting a portion 16' of the jaw and the other forced toward it by a fluid motor or jack 22. When assembled in the jaws, the ends of the sleeves and wires are made to project beyond the jaws about as shown in Fig. 5 and the jaws are then moved relatively toward each other to bring the wires into abutting end-to-end relation. For this purpose, one jaw may be fixed and the other provided with a fluid ram or jack 23.

As previously indicated, I prefer to join the wires by resistance welding. When the assembled parts are in the position in which they are shown in Fig. 5, slight axial pressure is brought to bear and maintained on the wires and sleeves and welding current passed through the work for the period of time required to bring the same to welding temperature. During the last few cycles of the passage of the welding current, the jaws are forcibly brought closer together under considerable pressure thereby forging the joint. This pressure is preferably sufficient to not only cause forging action at the joint but also to upset the ends of the sleeves and wires so as to produce a joint having the appearance of that shown in Figs. 1 and 7.

After the weld has been completed, the welded joint is allowed to quench or cool for a short period of time and then a low amperage current is passed through the joint to effect austempering thereof in the manner known in the art.

Figure 1:
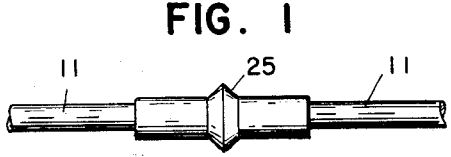
Fig. 1 is an elevational view of a completed joint produced by the method of the invention.
Figure 2:
Fig. 2 is a view showing the parts that make up the joint.
Figure 3:
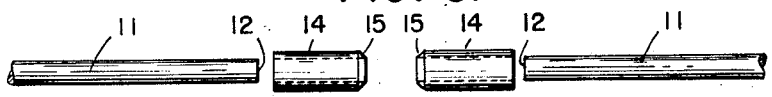
Fig. 3 is an elevational view showing the two sleeves after the same have beveled.
Figure 7:
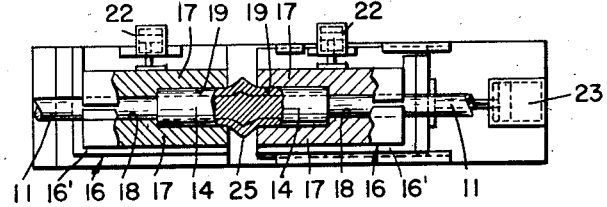
Fig. 7 is a sectional view of the parts shown in Fig. 5 after the same have been welded to complete the joint.
Figure 6:
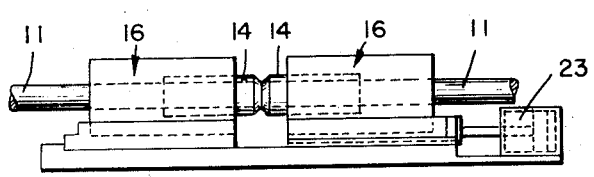
Fig. 6 is a view on line 6—6 of Fig. 5.

The resulting joint is shown in Figs. 1 and 7 in which numeral 25 has been used to designate what will be termed a collar formed by the welding together of the two sleeves 14. In the finished joint, the joined wires are reinforced by this collar 25 and the additional area thereof adds strength to the joint while the upset ends of the wires within the collar 25 furnishes the grip to prevent the wires being pulled apart under tension. In addition, the wire in the region of the weld is stiffened by the collar and this prevents undue bending or distortion of the wire in use, such as might cause a fracture to develop in the welded joint where the metal may be somewhat more brittle than in the other parts of the wire.

There are several advantages attendant upon the use of the sleeves 14. For example, the dimensions of the sleeves may be varied in order to introduce a control factor for use in determining or controlling the heat-affected zone in the wire, the quenching rate of the wire, the shape and temperature of the heat-effected zone and the time of welding and hence the grain growth in the zone. It is also true that the forging pressure upon the wire may be controlled by the restraining action of the sleeve sections since the thicker the sleeve the higher the forging pressure that will be brought to bear in the center of the wire. In addition the clamping plates at the jaws of the welding machine may be varied in size to vary the quenching rate of the work.

While I prefer to bevel the ends of the sleeves as above described, this is not absolutely essential. For example, the ends of the wires may be rounded to a somewhat convex shape and the ends of the sleeves left flat and positioned slightly back of the ends of the wires.

Although the invention has been particularly shown and described, it is contemplated that various changes and modifications can be made without departing from the scope thereof as defined in the claims. In this connection I wish to point out that I do not intend to limit the broader aspects of the method to the use of resistance welding of the wire sections, said collar being welded at its center to said wire sections.

I claim:

1. The method of joining a pair of single wires in end-to-end relation which comprises driving a tightly-fitting sleeve on the end of each wire, placing the ends of the wires in abutting relation, passing an electrical current therethrough of sufficient amperage to heat the wires and sleeves at their abutting ends to fusion temperature, and forcibly pressing the wires and sleeves together axially to forge the joint and upset the ends of the wires and sleeves.

2. The method of joining a pair of single, high tension steel wires in end-to-end relation which comprises tightly fitting a sleeve over the end of each wire and positioning the sleeves to be coterminous with the wires, providing a beveled edge on the ends of the sleeves at the ends of the wires, positioning the wires in abutting end-to-end relation, and welding the ends of the wires and sleeves together to form a unitary product.

3. A unitary joined wire structure characterized by a joint having greater strength than the wire sections of the structure comprising a pair of single, high tension steel wire sections joined by a weld in end-to-end relation, and a collar overlying the weld and the adjacent end portions of the wire sections, said collar being formed of a pair of sleeves welded together, said collar being welded at its center to said wire sections.

4. A structure as defined in claim 3 in which said collar is formed of a pair of sleeves welded together and in which the welded ends of the sleeves and welded ends of the wire sections are upset.

ADOLF G. BUTLER.

REFERENCES CITED

The following references are of record in the file of this patent:

UNITED STATES PATENTS

| Number | Name | Date |
| --- | --- | --- |
| Re. 19,542 | Williams | Apr. 16, 1935 |
| 1,363,355 | Sander | Dec. 28, 1920 |
| 2,301,899 | McBain | Nov. 10, 1942 |